United States Patent [19]
Löhr et al.

[11] 3,971,420
[45] July 27, 1976

[54] DOSING DEVICE FOR INDUSTRIAL COOKING APPARATUS

[75] Inventors: Alfred Löhr, Bochum; Wolfgang Schwan; Wolfgang Tschek, both of Gelsenkirchen; Günter Schreiber, Lunen, all of Germany

[73] Assignee: F. Küppersbusch & Söhne Aktiengesellschaft, Gelsenkirchen, Germany

[22] Filed: Dec. 10, 1974

[21] Appl. No.: 531,373

[30] Foreign Application Priority Data
Dec. 11, 1973 Germany............................ 2361520

[52] U.S. Cl.................................. 141/231; 222/166; 222/176; 214/17 CA; 214/302
[51] Int. Cl.² .......................................... B65B 1/04
[58] Field of Search ........... 222/129, 148, 176, 160, 222/164, 166, 180; 99/485, 486, 487, 494, 516, 534, 536; 259/165; 141/231; 214/301, 302, 17 C, 17 CA

[56] References Cited
UNITED STATES PATENTS

| | | | |
|---|---|---|---|
| 2,339,396 | 1/1944 | Harvey | 222/166 X |
| 2,504,013 | 4/1950 | Ellis | 68/12 FA |
| 2,712,746 | 7/1955 | Bochan | 222/148 X |
| 2,781,799 | 2/1957 | Bradford | 141/231 X |
| 3,140,011 | 7/1964 | Powers et al. | 222/176 X |
| 3,398,858 | 8/1968 | Holloway | 222/176 X |
| 3,764,041 | 10/1973 | Noll | 222/148 X |
| 3,804,300 | 4/1974 | Cox | 222/148 X |

OTHER PUBLICATIONS
Kuppersbusch Brochure; Germany, 5-71.

*Primary Examiner*—Robert B. Reeves
*Assistant Examiner*—Joseph J. Rolla
*Attorney, Agent, or Firm*—Spencer & Kaye

[57] ABSTRACT

A dosing device for the automatic introduction of ingredients into a vessel of an industrial cooking apparatus has a mobile stand having a space for accommodating the stationary vessel of the cooking apparatus; a cantilever member secured to the stand above the space; a plurality of ingredient containers pivotally secured to the cantilever member and a spray tube mounted in at least one of the containers. Each container has a first position in which its contents are maintained therein and a second, or inwardly and downwardly tilted position in which the contents are discharged from the container by gravity.

10 Claims, 4 Drawing Figures

DOSING DEVICE FOR INDUSTRIAL COOKING APPARATUS

BACKGROUND OF THE INVENTION

This invention relates to a dosing device for the automatic introduction of ingredients such as flour, spices and the like into the vessel of industrial cooking apparatus. The device has a plurality of compartments for receiving the ingredients to be added.

Dosing devices for introducing cooking ingredients such as flour, spices or the like into the vessel of industrial cooking apparatus are known. These known dosing devices are stationary and have a box pivotally attached to the cooking apparatus. The box, in turn, supports a removable container having partitions of various sizes for receiving the cooking or baking ingredients. An electric stepping switch determines the moment for the addition of the individual ingredients so that no manual operation is necessary as the cooking program progresses. At the predetermined moments the stepping switch causes closure members on the partitions of the container to open so that the respective contents may fall into the cooking vessel. In this connection, reference is made to a prospectus describing a cooking apparatus named "Saucier-Mat" and published by the firm F. Kuppersbusch & Sohne of Gelsenkirchen, Germany. It has been found, however, that the above-outlined dosing device does not satisfactorily operate during the opening of the closures and the emptying of the partitions.

SUMMARY OF THE INVENTION

It is an object of the invention to provide an improved dosing device of the above-outlined type which operates in a more satisfactory manner than devices known heretofore and the versatility of which, with regard to its application in industrial kitchens is increased.

This object and others to become apparent as the specification progresses, are accomplished by the invention, according to which, briefly stated, the dosing device for the automatic introduction of ingredients into a vessel of an industrial cooking apparatus has a mobile stand having a space for accommodating the vessel of the cooking apparatus; a cantilever member secured to the stand above the space; a plurality of ingredient containers pivotally secured to the cantilever member and a spray tube mounted in at least one of the containers. Each container has a first position in which its contents are maintained therein and a second, or inwardly and downwardly tilted position in which the contents are discharged from the container by gravity.

The invention thus provides a dosing device which includes several, independently pivotable containers for receiving individual cooking ingredients and which is not location-bound and can therefore be moved to and find application at, any location of an industrial kitchen. Further, with the dosing device according to the invention a thorough emptying of the ingredient containers is ensured.

DESCRIPTION OF THE PREFERRED EMBODIMENT

Figure 1:
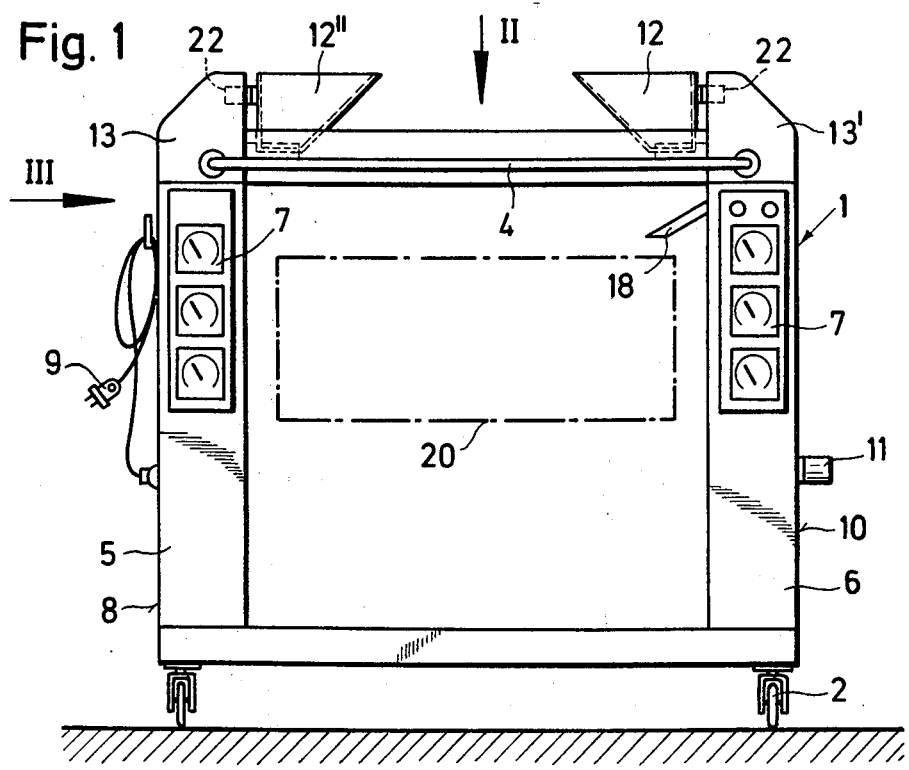
FIG. 1 is a schematic front elevational view of a preferred embodiment of a dosing device.
Figure 2:
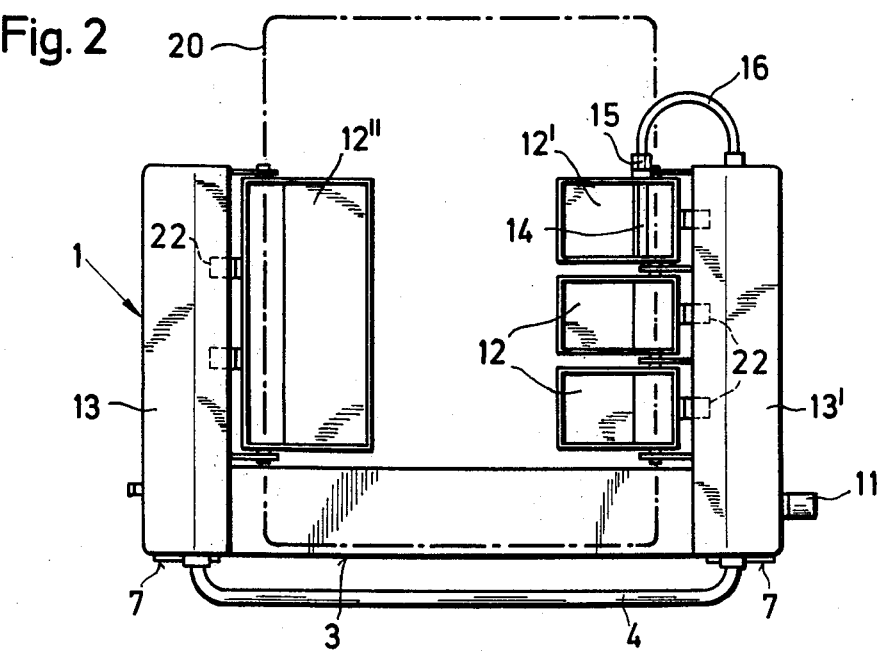
FIG. 2 is a schematic top plan view of the same embodiment.
Figure 3:
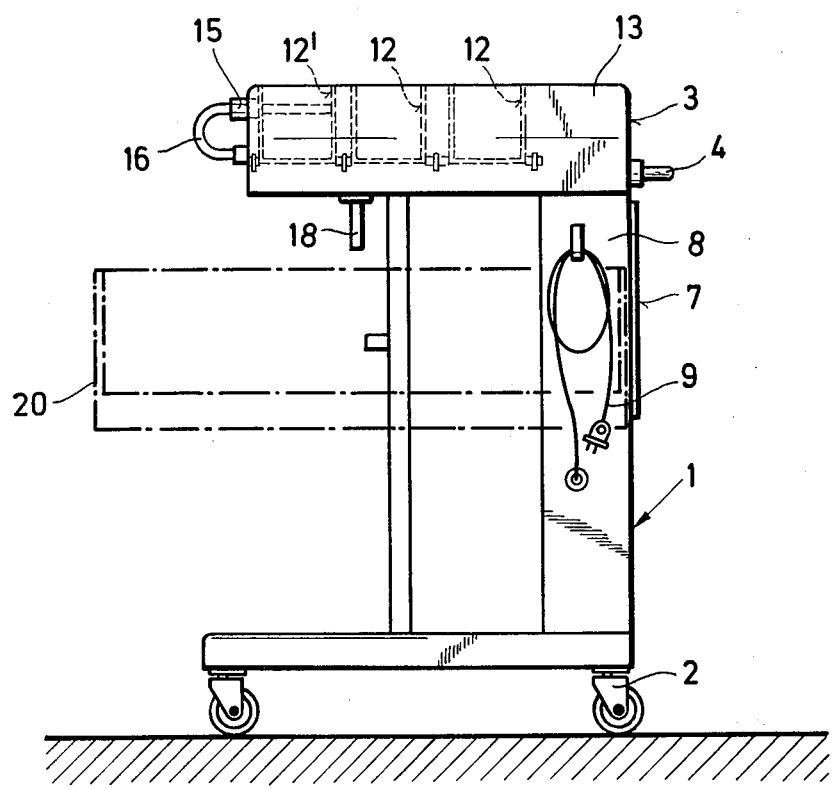
FIG. 3 is a schematic side elevational view of the same embodiment.
Figure 4:
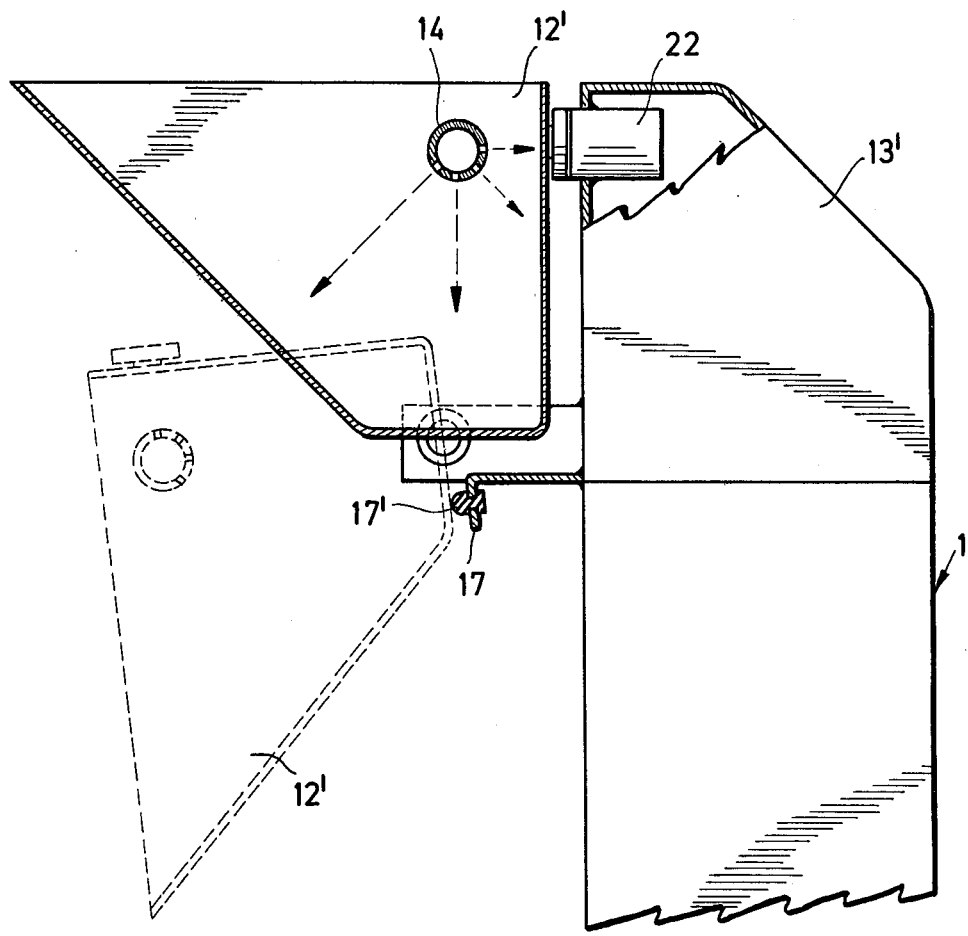
FIG. 4 is a schematic front elevational view of some components of FIG. 1 shown on an enlarged scale.

Turning now to FIGS. 1 and 2, there is illustrated a dosing device having a generally U-shaped stand 1 supported by casters 2 to render the stand mobile. At the frontal (service) side 3 of the stand 1 there is provided a handle 4 for moving the stand on the casters 2. Further, in the two walls 5 and 6 of the service side 3, there are disposed several timers 7 which automatically control various functions of the cooking program. Also referring now to FIG. 3, at a lateral wall 8 of the stand 1 there is provided an electric cable connection 9 by means of which electric current may be supplied to a cooking apparatus having a vessel 20. As it may be well seen by observing FIGS. 1 and 3 together, between the vertically extending walls 5 and 6 there is provided a bay-like, generally U-shaped space that accommodates the vessel 20 when the stand 1 is moved next to the vessel 20 into an operative position. At the other lateral wall 10 of the stand 1 there is provided a rapid coupling 11 for a water hose connection through which the vessel of the cooking apparatus is supplied with the required quantities of water. In the upper zone of the stand 1 there are disposed a plurality of containers 12,12' and 12" which are oriented towards the vessel 20 and which serve for receiving ingredients such as flour, spices or the like. The containers are secured to cantilever members 13,13' affixed to the stand 1. The ingredient containers 12,12' and 12" are, as it may be well observed in FIG. 4, pivotally supported by the cantilever members 13,13' and are held in their normal position by means of permanent magnets 22. The tilting of the containers for the purpose of emptying them is effected automatically by means of the timers 7 which affect the force of the permanent magnets 22. Devices in which the force (flux) of a permanent magnet (holding magnet) is temporarily reduced, for example, by the flux of a temporarily energized solenoid, for releasing a member are well known. Such a device is disclosed, for example, in United States Patent No. 2,888,290, issued May 26th, 1959. The timers 7 are preset for tilting, and thus emptying, the individual containers at predetermined moments during the cooking program.

Each container thus has a first or upright position in which its contents are maintained therein and a second, or inwardly and downwardly tilted position in which its contents fall into the vessel 20 by gravity.

It is to be understood that instead permanent magnets, other controllable retaining and releasing devices may be used, such as a solenoid-operated detent which hooks into the associated ingredient container and which allows it to swing into its second position upon energization of the solenoid. The mechanism holding and releasing the individual containers, the command signal emitter (in this case, the timer 7) and the connections between the command signal emitter and the holding mechanism are conventional arrangements by themselves. As each ingredient container swings downwardly, it abuts — in its terminal position — against a stop 17 which has a resilient buffer 17' made, for example, of rubber. In this manner, there is provided an additional shaking effect which insures a thorough emptying of the ingredient container.

One ingredient container 12'' which extends over the entire length of the cantilever member 13 has a capacity of approximately 12 1, whereas the other ingredient containers 12, 12' each have a capacity of approximately 4 1. One ingredient container 12' is expediently provided with a stationarily arranged spraying tube 14 which is attached to a water hose 16 by means of a rapid coupling 15. The water supply hose 16 is connected with a water supply pipe within the stand 1. The ingredient container 12' equipped with the spraying tube 14 serves expediently for receiving dough like or thick-flowing material which, in the tilted position of the container 12' are rinsed out thoroughly by means of the spraying tube 14.

In the cantilever member 13' there is provided a water supply nipple 18 which is oriented towards the cooking vessel 20 and which serves for filling the same with water. This water supply is also controlled by means of a settable timer so that the cooking vessel may be supplied automatically with a preselected quantity of water at a predetermined moment. This predetermined moment for triggering the water supply is set at another timer and is controlled by the latter. It is to be understood that instead of the timers 7 there may be utilized a punch card-controlled programming device.

It will be understood that the above description of the present invention is susceptible to various modifications, changes and adaptions, and the same are intended to be comprehended within the meaning and range of equivalents of the appended claims.

We claim:

1. A dosing device for the automatic introduction of ingredients into a vessel of an industrial cooking apparatus, comprising in combination:
   a. a mobile stand including means defining a bay-like, generally U-shaped space for receiving a stationary vessel of a cooking apparatus when said stand is moved next to the vessel into an operative position;
   b. at least one cantilever member secured to said stand above said space;
   c. a plurality of ingredient containers;
   d. means pivotally attaching said containers to said cantilever member for providing for each container a first position in which the contents of the container are maintained therein and a second, or inwardly tilted, position in which the contents are discharged from the container by gravity directly into the vessel;
   e. a spray tube mounted on at least one of said containers; and
   f. means for supplying said spray tube with water for rinsing said at least one of said containers.

2. A dosing device as defined in claim 1, further comprising water supply coupling means supported by said stand.

3. A dosing device as defined in claim 1, wherein said ingredient containers have differing capacities.

4. A dosing device as defined in claim 1, further comprising a water supply outlet nipple supported by said stand and oriented towards said space.

5. A dosing device as defined in claim 1, further comprising a stop means secured to said cantilever member in the pivotal path of at least one of said containers for abutting the latter as it reaches its said second position.

6. A dosing device as defined in claim 5, wherein said stop means is resilient.

7. A dosing device as defined in claim 1, further including means for effecting pivotal motion of each container individually from said first position to said second position.

8. A dosing device as defined in claim 7, wherein said means for effecting pivotal motion includes permanent magnet means for maintaining the containers in said first position.

9. A dosing device as defined in claim 7, wherein said means for effecting a pivotal motion includes timer means operatively connected with each said ingredient container and said means for supplying said spray tube with water.

10. A dosing device as defined in claim 7, wherein said means for effecting a pivotal motion includes a punch card-controlled programming device operatively connected with each said ingredient container and said means for supplying said spray tube with water.

* * * * *